Jan. 24, 1961 W. S. PRAEG 2,968,998
INTERNAL GEAR SHAVING MACHINE
Original Filed June 14, 1954 9 Sheets-Sheet 1

FIG.1.

INVENTOR.
WALTER S. PRAEG
BY
ATTORNEYS

Jan. 24, 1961 W. S. PRAEG 2,968,998
INTERNAL GEAR SHAVING MACHINE
Original Filed June 14, 1954 9 Sheets-Sheet 2

INVENTOR.
WALTER S. PRAEG
BY
ATTORNEYS

Jan. 24, 1961  W. S. PRAEG  2,968,998
INTERNAL GEAR SHAVING MACHINE
Original Filed June 14, 1954  9 Sheets-Sheet 4

INVENTOR.
WALTER S. PRAEG
BY
Whittemore, Hulbert
& Belknap ATTORNEYS

Jan. 24, 1961 W. S. PRAEG 2,968,998
INTERNAL GEAR SHAVING MACHINE
Original Filed June 14, 1954 9 Sheets-Sheet 5

INVENTOR.
WALTER S. PRAEG
ATTORNEYS

United States Patent Office 2,968,998
Patented Jan. 24, 1961

2,968,998

INTERNAL GEAR SHAVING MACHINE

Walter S. Praeg, Detroit, Mich., assignor to National Broach & Machine Company, Detroit, Mich., a corporation of Michigan Original application June 14, 1954, Ser. No. 436,365, now Patent No. 2,917,973, dated Dec. 22, 1959. Divided and this application Oct. 24, 1958, Ser. No. 769,337

7 Claims. (Cl. 90—1.6)

The present invention relates to an internal gear shaving machine.

The present application is a division of my prior copending application Serial No. 436,365, filed June 14, 1954, now Patent 2,917,973 issued Dec. 22, 1959.

It is an object of the present invention to provide a machine for finishing the teeth of internal gears characterized by flexibility of the machine to facilitate loading and unloading, the provision of means for adjusting the work support to provide for shaving the teeth of the gear at a taper, and the adjustability of the work support being arranged to permit tilting of the work support to facilitate loading work pieces having shafts attached thereto.

It is a further object of the present invention to provide an internal gear shaving machine including a vertically adjustable knee, a slide assembly on the knee comprising a sub-slide reciprocable thereon toward and away from a work support, an intermediate slide on the sub-slide including means for effecting quick movement of the intermediate slide toward and away from the work support, a swivel plate on the intermediate slide to provide for setting a gear-like finishing tool with its axis disposed at an angle to the axis of a work piece, and a cutter head mounted on the swivel plate, the cutter head including a projecting spindle for supporting a gear-like cutter, and means intermediate the cuter head and swivel plate mounting the cutter head for adjustment on the swivel plate in a direction parallel to the axis of the spindle.

Other objects and features of the invention will become apparent as the description proceeds, especially when taken in conjunction with the accompanying drawings illustrating preferred embodiments of the invention, wherein:

The present machine is designed primarily for use in finishing the teeth of internal gears. It is intended to carry out the operation in which the teeth of an internal gear are machined, as by a shaving operation performed by a gear-like cutter rotating in mesh with the teeth of the internal gear, the axes of the gear and cutter being crossed at a limited angle. The shaving operation is carried out by driving either the gear or cutter, and in the present instance the gear in rotation, the cutter being driven in rotation as a result of the intermeshing engagement between the gear and cutter. A relative traverse is introduced between the gear and cutter in a plane parallel to the axes of both the gear and cutter and in a direction in such plane parallel to the axis of the gear. The traverse stroke is carried out at relatively slow speed while the cutter and gear are rotated at substantial speeds. The traverse stroke is limited so that the gear and cutter remain in mesh at both ends of the stroke. Preferably, two or more traverse strokes are provided and the direction of rotation of the gear and cutter is reversed at the end of each stroke.

*Machine assembly*

The machine comprises a general assembly best illustrated in Figures 1–4 and includes a base 10 having a horizontal ledge portion 12 at one side of the machine and a vertical frame portion 14 at the rear of the ledge portion 12. Vertically extending ways 16 are provided on the frame portion 14 and mounted for vertical movement on these ways is a knee 18. At the opposite side of the machine the base includes a vertically extending frame portion 20 at the top of which is mounted work supporting and driving mechanism indicated generally at 22.

Figure 1:
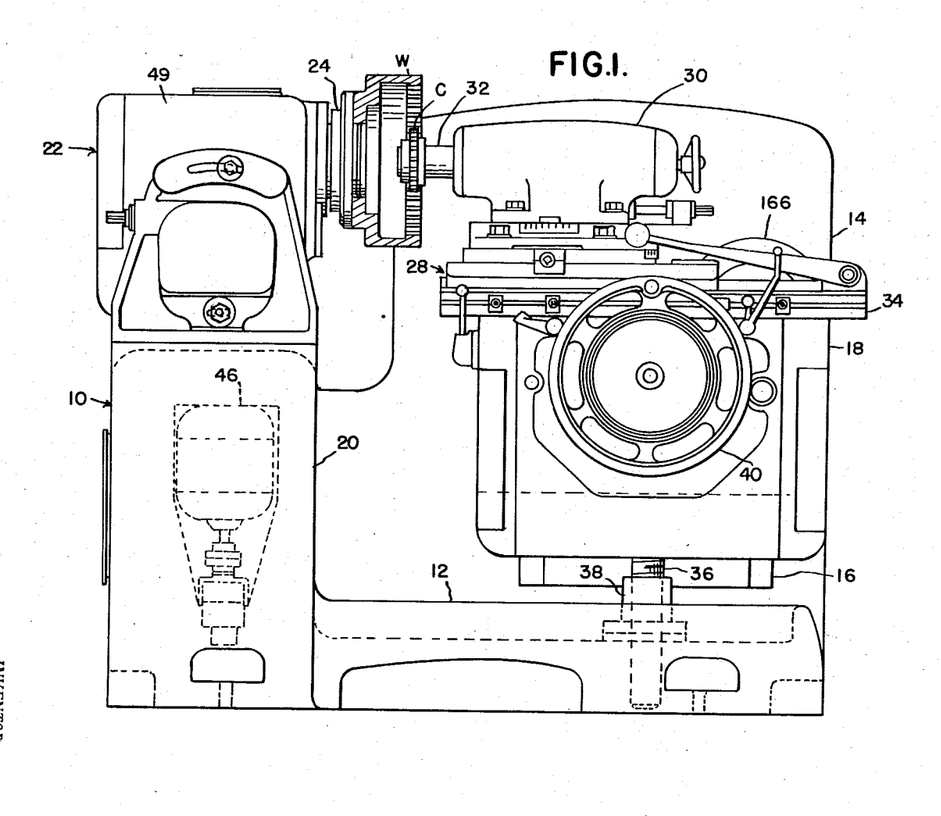
Figure 1 is a front elevation of the machine with the work piece in section.
Figure 2:
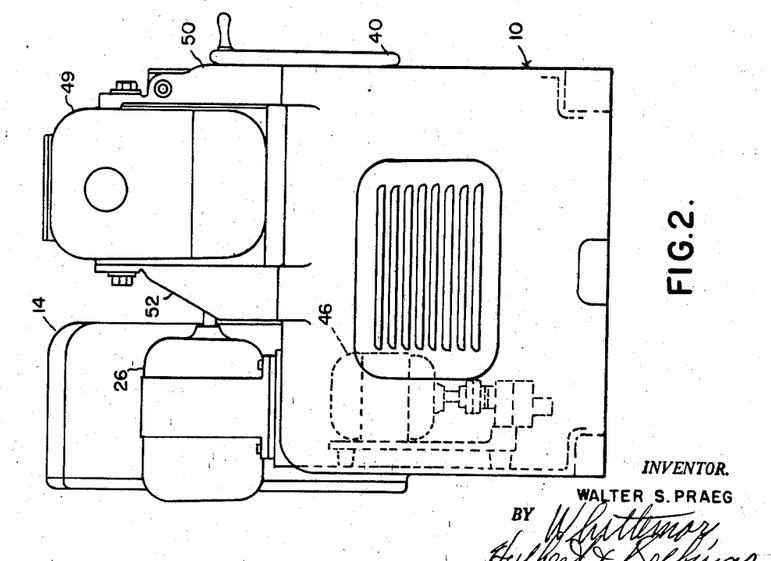
Figure 2 is an end elevation of the machine as seen from the left in Figure 1.
Figure 3:
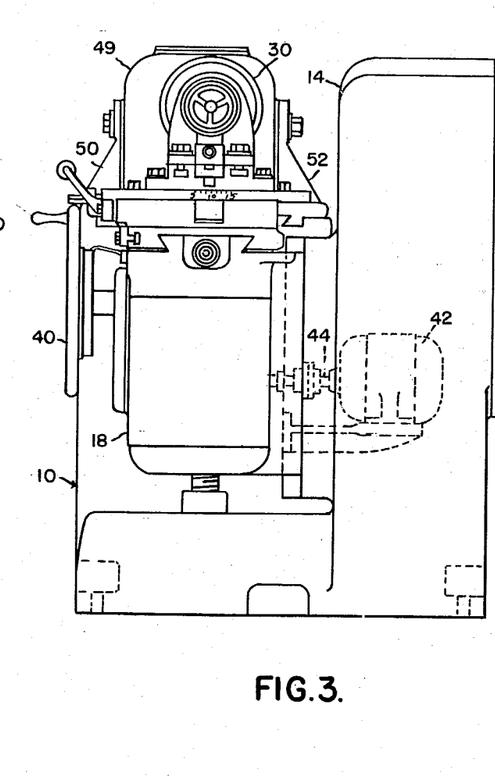
Figure 3 is an end elevation of the machine as seen from the right in Figure 1.
Figure 4:
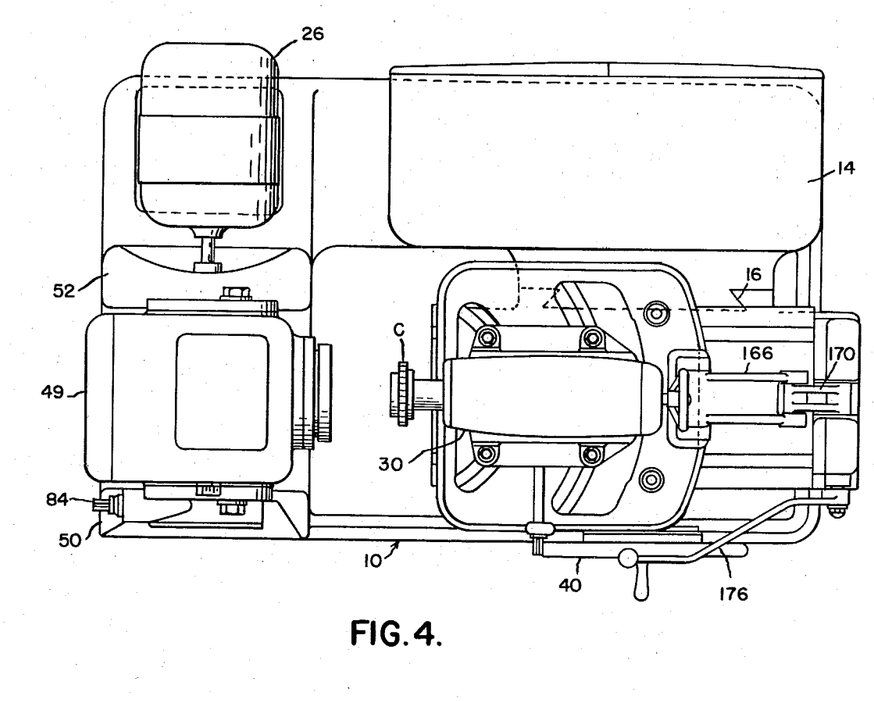
Figure 4 is a plan view of the machine.
Figure 5:
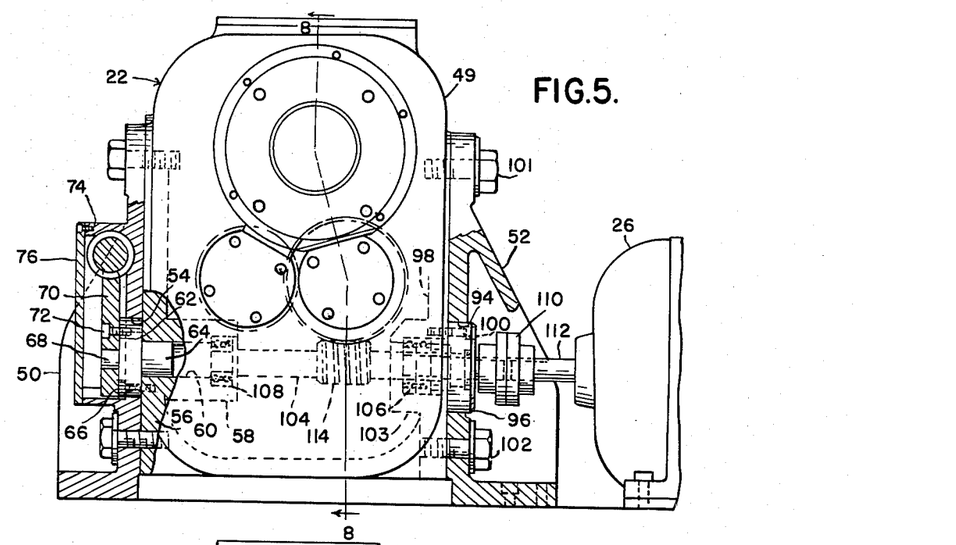
Figure 5 is an enlarged elevational view of the work support looking toward the left as seen in Figure 1.

As will subsequently be described in greater detail, the work supporting mechanism includes a rotary work spindle, a portion of which is indicated at 24, adapted to carry a work piece W, and a motor 26 is carried by the base and is suitably coupled through gearing to the spindle 24 to drive the work spindle 24 in rotation. In addition, a slide assembly indicated generally at 28 is carried at the top of the knee 18 and includes a cutter head 30 including a cutter spindle 32 adapted to carry a gear-like cutter C. The slide assembly 28 includes a sub-slide 34 connected to driving mechanism adapted to effect horizontal rectilinear reciprocation of the slide assembly from right to left, as seen in Figure 1, or toward and away from the work support 22. Means are provided for effecting vertical movement of the knee 18, this means comprising a vertical threaded shaft 36 associated with a nut 38 carried by the ledge portion 12 of the base. As is well understood in the art, both manual and automatic means may be provided for effecting vertical movement of the knee 18, a hand wheel 40 being connected to suitable gearing (not shown) for effecting manual rotation of the shaft 36, and automatic mechanism (also not shown) may be provided for effecting intermittent rotation of the shaft at the end of the traverse strokes of the sub-slide 34.

Means later to be described in detail are provided for effecting relatively slow traverse of the cutter and this means includes the traverse motor 42 located within the frame portion 14 and connected to suitable gearing through a drive shaft 44.

Located within the frame portion 20 is a third motor 46 adapted to drive a coolant pump for supplying coolant to the cutting zone.

Work supporting and driving mechanism

Referring now to Figures 5–8 there is illustrated the details of the work supporting and driving mechanism. This mechanism comprises a work head 49 in the form of a hollow casting. Secured at the top of the frame portion 20 of the base are a pair of trunnions 50 and 52 between which the work head 49 is pivoted. The trunnion 50 is provided with a circular opening 54. In alignment with the opening 54 the side wall 56 of the work head 49 is provided with an inwardly extending boss 58 having a cylindrical opening 60 therethrough. Received within the circular opening 54 is a circular bearing 62 having a locating pin portion 64 received within the cylindrical opening 60 of the boss 58. The bearing 62 is rigidly secured to the side wall 56 of the work head 49 as by screws indicated at 66. Extending outwardly from the bearing 62 is a locating pin portion 68 and mounted on the pin portion 68 is a toothed sector 70 bolted or otherwise secured thereto as indicated at 72.

The trunnion 50 includes an outwardly extending flange 74 providing a housing for the sector 70 and associated mechanism, this housing being closed by a removable cover plate 76. Extending into the housing is a shaft 78 carrying a worm 80 which meshes with the toothed sector 70. The shaft 78 is sleeved within a cylindrically apertured projection 82 of the casting, the outer end of the shaft being squared as indicated at 84 for engagement by a suitable adjusting tool.

From the foregoing it will be apparent that rotation of the shaft 78 will result in rocking movement of the work head 49 about the trunnion axis. In order to lock the head 49 in angularly adjusted position, the trunnion 50 is provided with slots 86 and 88 and clamping bolts 90 and 92 respectively extend through the slots and into threaded recesses in the adjacent side wall of the work head 49.

The other trunnion 52 is similarly provided with a circular opening 94 in which is received a cylindrical bearing 96 which is bolted or otherwise secured to the side wall 98 of the work head 49, one of the securing bolts being indicated at 100. Bolts 101 and 102 are provided which extend through slots in the trunnion 52 corresponding respectively to the slots 86 and 88 formed in the trunnion 50, to provide for angular adjustment of the work head 49 about the trunnion axis and to provide for locking the work head firmly in adjusted position. The bearing 96 has a central opening therethrough and the side wall 98 of the head 49 includes an inwardly extending boss 103 apertured to receive a drive shaft 104. The drive shaft 104 is mounted in the bore of the boss 103 by bearings indicated at 106, the other end of the shaft 104 being mounted in bearings 108 located in the cylindrical bore 60 of the boss 58.

The shaft 104 is connected by a coupling 110 to a shaft 112 of the work drive motor 26.

Means are provided in the work head 49 connecting the shaft 104 to the work spindle 24. This means comprises a worm 114 meshing with a worm gear 116 carried by a shaft 118. A second shaft 120 is connected to the shaft 118 by change gears indicated at 122 and 124. Mounted on the shaft 120 is a gear 126 adapted to mesh with a gear 128 keyed or otherwise secured to the work spindle 24.

Figure 8:
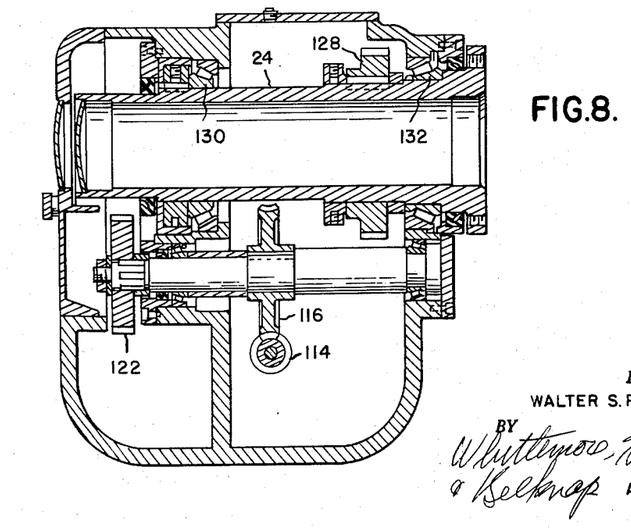
Figure 8 is a sectional view on the line 8—8, Figure 5.
Figure 9:
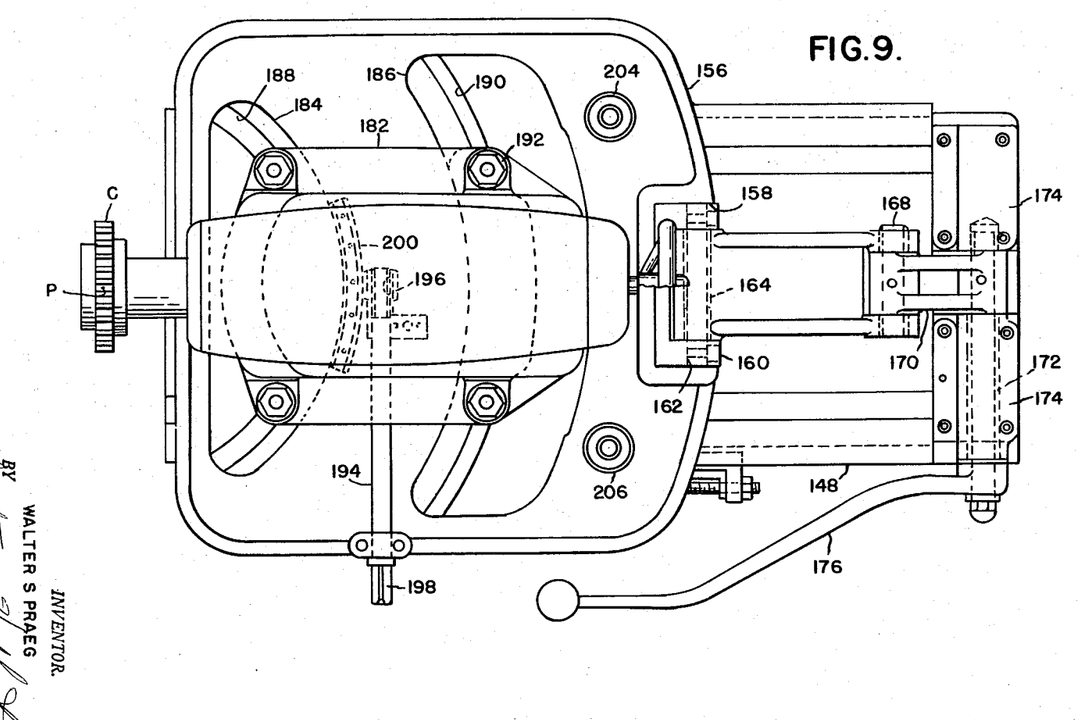
Figure 9 is an enlarged plan view of the cutter support.
Figure 10:
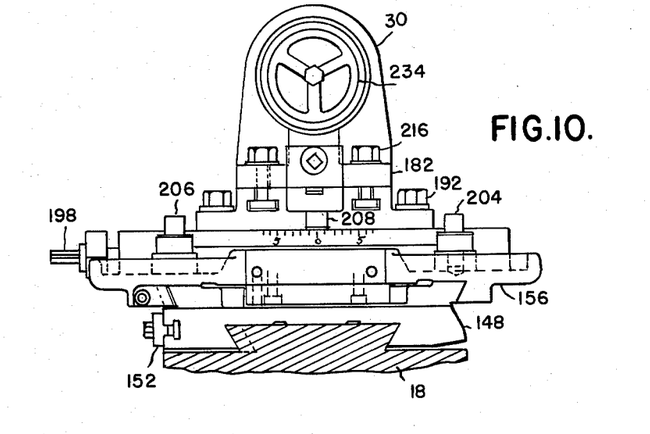
Figure 10 is an enlarged elevational view of the cutter support as seen from the right in Figure 1, with parts in section.
Figure 11:
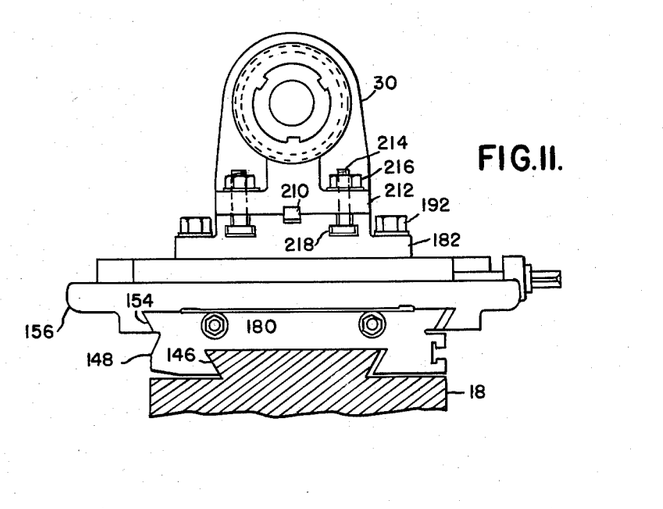
Figure 11 is an enlarged elevational view of the cutter support as seen from the left in Figure 1, with parts in section.

The work spindle 24, as best seen in Figure 8, is in the form of a hollow shaft suitably mounted in bearings 130 and 132 and is adapted to be provided with a work gripping fixture which may be of any conventional type and is accordingly not illustrated herein.

Figure 6:
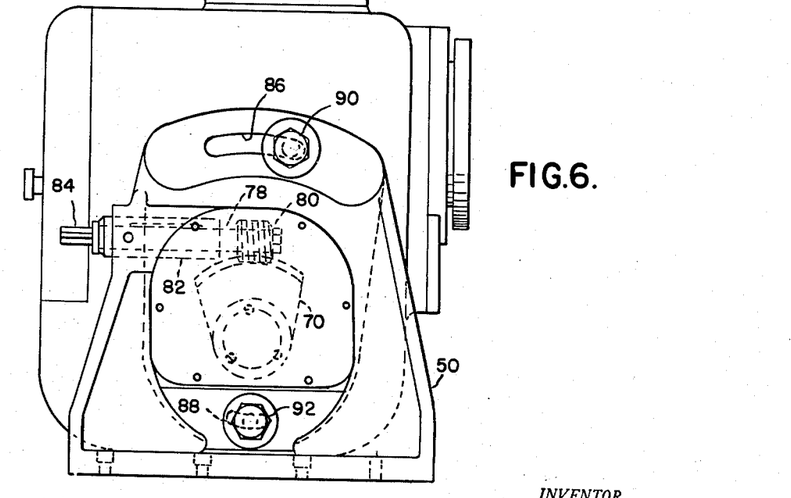
Figure 6 is an enlarged front elevational view of the work support.
Figure 7:
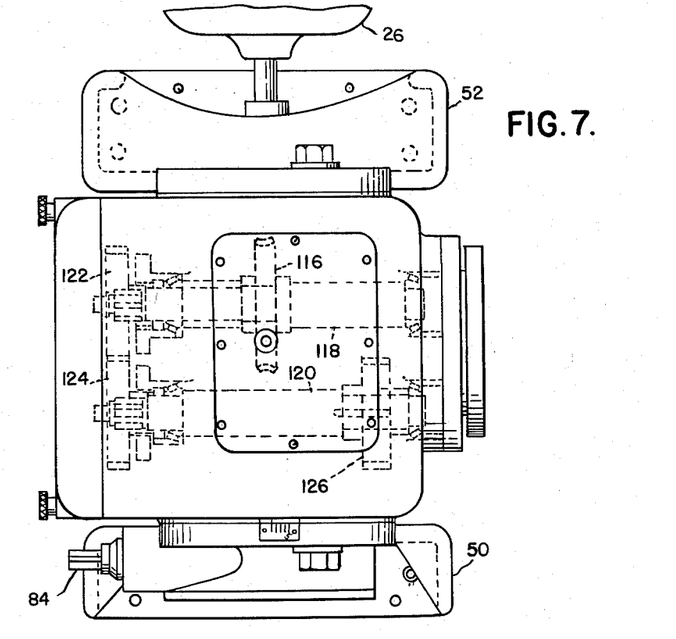
Figure 7 is an enlarged plan view of the work support.

The angular adjustment of the work head 49 between the trunnions 50 and 52 serves two valuable functions. In the first place the work head may be inclined through a very small angle either upwardly or downwardly, with the result that an internal gear carried thereby will have its teeth shaved to a tapered form in accordance with the angle setting of the work head. The second function provided by the angular adjustment of the work head is to permit the work head to be swung counterclockwise as seen in Figure 6, a substantial amount so as to accommodate a work piece in which an internal gear is provided on a relatively long shaft. By rocking the work head to an extreme position, the shaft may be inserted to bring the internal gear in the proper position on the machine without interference with the cutter head or other part of the machine.

Cutter supporting and driving mechanism

The mechanism for supporting and effecting proper movement of the cutter is illustrated in Figures 9–12.

Figure 12:
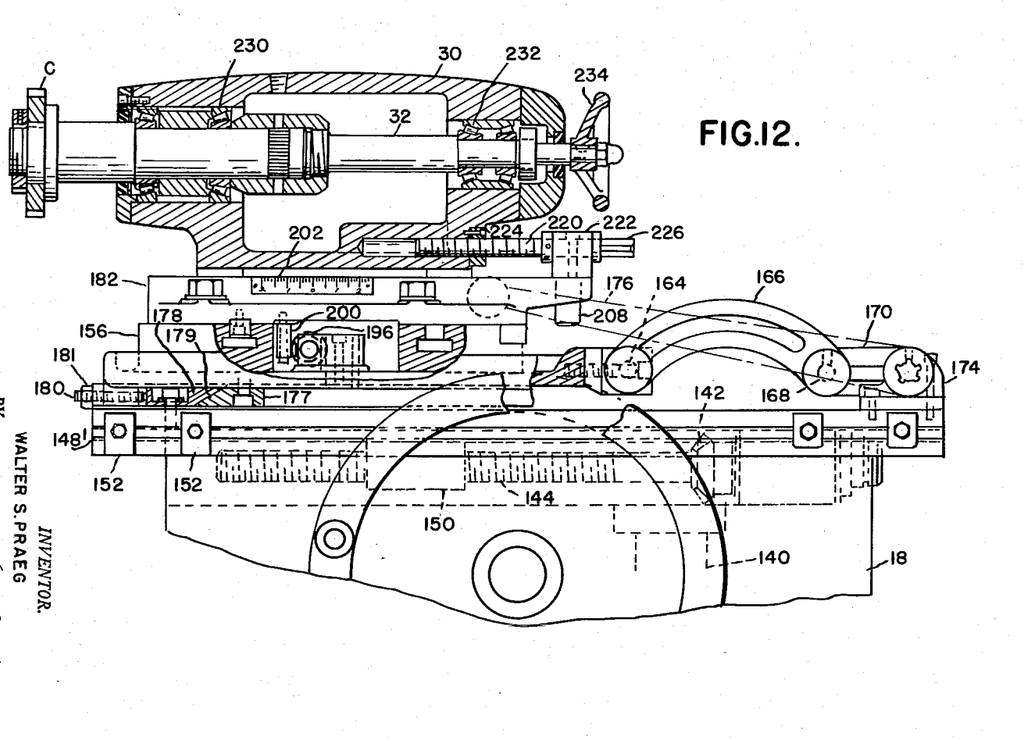
Figure 12 is an enlarged front elevational view of the cutter support and associated mechanism with parts in section.

Referring first to Figure 12, there is shown the upper portion of the knee 18 and it will be observed that the knee carries a drive shaft 140 having at its upper end a bevel gear (not shown) adapted to connect with a bevel gear 142 operatively connected to a traverse screw 144 mounted in the upper end of the knee. At its upper end the knee 18 is provided with ways 146 and mounted on the ways for rectilinear reciprocation is a sub-slide 148. The sub-slide has depending therefrom a feed nut 150 which engages the screw 144 so that rotation of the screw will result in slow traverse of the sub-slide 148 on the ways 146. Suitable mechanism, now conventional in the art, and including adjustable dogs 152 are provided for controlling the travel of the sub-slide 148 and for reversing the travel thereof at the end of the stroke. This mechanism may include means for effecting one or more complete reciprocations of the sub-slide 148, accompanied if desired by a vertical adjustment of the knee at the end of selected ones of the travel strokes.

The sub-slide 148 at its upper surface is provided with ways indicated at 154 and mounted on the ways 154 for longitudinal movement is an intermediate slide 156. The ways 146 and 154 are parallel with each other. The intermediate slide 156 is formed at the end thereof remote from the work support with a recess 158 in which is mounted a block 160 having openings 162 therein which receive a pivot pin 164. A link 166 of a toggle mechanism is pivoted at one end to the pin 164, the other end of the link 166 being pivoted by means of a pin 168 to an arm 170 keyed or otherwise secured to a shaft 172 mounted in bearings 174 bolted or otherwise secured to an end of the sub-slide 148. At its outer end the shaft 172 has keyed or otherwise secured thereto an operating handle or lever 176.

In order to insure that the cutter head is firmly held in proper operating position, the intermediate slide 156 has adjacent its inner end a block 177. Rigidly secured to the sub-slide 148 is a transversely extending block 178. The blocks 177 and 178 have interfitting inclined surfaces indicated generally at 179 so that as the slide 156 moves to the left, as seen in Figure 12, the block 177 acts as a cam to lock the slide 156 downwardly in firm engagement with the block 178 carried by the sub-slide 148.

At its end adjacent to the work support the sub-slide 148 is provided with an adjustable abutment including the adjusting screws 180 and lock nuts 181. The arrangement is such that as the operating lever 176 is swung clockwise from the position illustrated in Figure 12, the intermediate slide 156 is moved to the right in a direction away from the work support for a substantial distance. This moves the cutter head into a clearance position which will facilitate loading and unloading work pieces. When the operating lever 176 is swung counterclockwise to the position illustrated in Figure 12, the intermediate slide 156 is moved to the left into positive engagement with the abutment means, thus insuring that the intermediate slide 156 is always in an exactly predetermined condition relative to the sub-slide 148 when the machining operation is carried out.

Mounted on the intermediate slide 156 is a swivel plate 182. The upper surface of the intermediate slide 156 is provided with bosses 184 and 186, these in turn being provided with arcuate key slots 188 and 190 respectively, the common center of the arcuate slots 188 and 190 being located at a point P which is on the axis of the cutter spindle, later to be described, and which is midway between the sides of the cutter C. The swivel plate 182 is mounted on the intermediate slide 156 by means of T-bolts, the heads of which are mounted in the T-slots 188 and 190, and adapted to cooperate with nuts 192 to clamp the swivel plate 182 in angularly adjusted position. Mounted on the intermediate slide 156 is a shaft 194 having a worm 196 at its inner end, and having its outer end squared as indicated at 198 for cooperation with an adjusting tool. Depending from the underside of the swivel plate 182 is a toothed sector 200 which meshes with the worm 196. Obviously, when the nuts 192 are loosened the shaft 194 may be rotated by a suitable hand tool to effect desired angular adjustment of the swivel plate 182 with respect to the intermediate slide 156. Preferably, a scale 202 is provided to indicate the crossed axes setting. More accurate means may be employed for indicating the angular setting and this means may include locator pins 204 and 206 which cooperate with a depending pin 208 to provide for indicator readings therebetween. The swivel plate 182 carries the cutter head 30 and the cutter head is mounted thereon for longitudinal adjustment. For this purpose a rectilinear guide key 210 is provided intermediate the swivel plate and the bottom surface of the cutter head. The cutter head 30 is provided with flanges 212 through which extend T-bolts 214 associated with nuts 216, the heads of the bolts being received in rectilinear T-slots 218.

The key 210 is parallel to the cutter spindle 32 so that adjustment of the cutter head 30 is parallel to the axis of the cutter spindle independent of the angular adjustment of the swivel plate 182. In order to effect fine and accurate adjustment of the cutter head 30 relative to the swivel plate 182, an adjusting screw 220 is provided which is mounted for rotation and held against longitudinal movement by a bracket 222 carried by the swivel plate 182. Associated with the screw 220 is a nut 224 bolted or otherwise secured to the cutter head in which the screw 220 is threaded. The outer end of the screw is shaped as indicated at 226 for operation with a hand tool.

As a result of the foregoing construction the cutter head 30 may be adjusted toward or away from the work support in parallelism with the cutter spindle by loosening the nuts 216 and rotating the adjusting screw 220, after which the nuts may be tightened to lock the cutter spindle in adjusted position. This adjustment of the cutter head is for the purpose of insuring that the cutter C is properly located with the common normal to the axes of the work gear W and the cutter C intermediate opposite sides of the cutter C.

The cutter spindle 32 is mounted in the cutter head 30 in suitable bearings indicated generally at 230 and 232 in which the cutter spindle is freely rotatable. In operation the cutter C which is carried by the end of the cutter spindle which projects toward the work support, is in mesh with the work gear which is driven in rotation, and accordingly, the cutter spindle 32 is rotated through the meshed engagement of the work gear W and the cutter C. However, to provide for proper registration between the teeth of the work gear and cutter as the hand lever 176 is moved to advance the cutter into cutting relation with the work gear, the shaft or spindle 32 at its outer end is provided with a small hand wheel 234. Thus, the operator will engage the hand wheel with one hand and operate the lever 176 with his other, effecting minor rotational adjustments of the cutter C as it moves into engagement with the work gear.

Figures 13, 14:
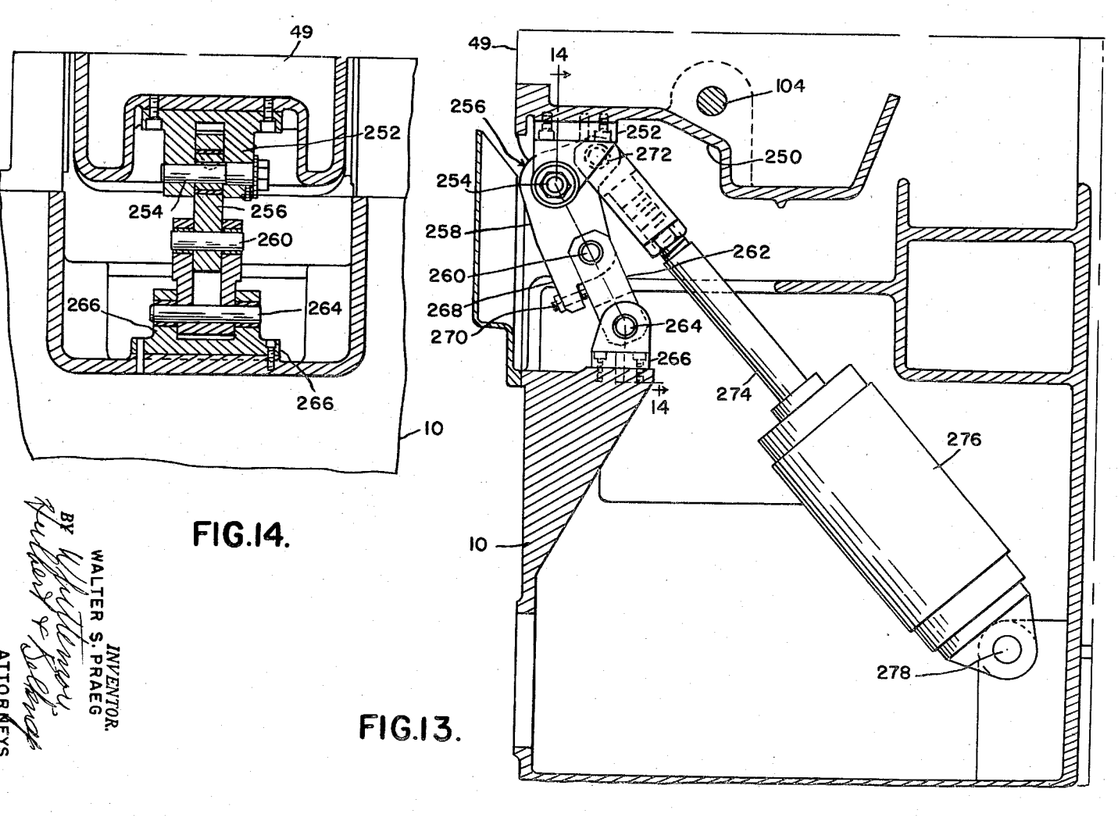
Figure 13 is a fragmentary elevation partly in section illustrating a modified form of the invention.
Figure 14 is a fragmentary section on the line 14—14, Figure 13.

Referring now to Figures 13 and 14 there is illustrated a modification of the invention. As illustrated in these figures, the work head 49 is formed with a recess 250 in which is rigidly secured a downwardly extending fork or clevis member 252 carrying a pivot pin 254 on which is mounted a bell crank 256 having a downwardly extending arm 258 connected by a pivot pin 260 to an arm 262. The arm 262 at its lower end is connected by a pivot pin 264 to a bracket 266 rigidly secured to the base 10 of the machine. The arm 258 of the bell crank includes an abutment portion 268 adapted to abut against one side of the arm 262 and is provided with an adjustable threaded abutment 270.

The other arm of the bell crank extends upwardly and to the right as viewed in Figure 13, from the pivot pin 254 and carries a pivot pin 272 by means of which it is connected to a piston rod 274 extending outwardly from a power cylinder 276 which is pivoted as indicated at 278 within the base 10 of the machine.

In this embodiment of the invention, as in that previously described, the work head 49 is mounted in suitable trunnions coaxial with the shaft 104 of the driving worm so that the head may be tilted upwardly from the position illustrated in Figure 13, which is the operating position, to a loading position in order to facilitate loading of the work gear into the work head. This construction is particularly advantageous where the work piece may have included as a part thereof an elongated shaft or the like.

From the foregoing description it will be observed that downward movement of the piston rod 274 rocks the bell crank 256 in a clockwise direction, and that the lower arm 258 of the bell crank and the arm or link 262 operate in the manner of a toggle, bringing the pivot point 254 downwardly in an arc about the axis of the worm shaft 104, thus tilting the right or inner end of the work head upwardly. Obviously, movement of the piston rod 274 in the opposite direction restores the parts to working position and the toggle action derived by the location of the pins 254, 260, and 264 in effect locks the head in operating position due to alignment of these axes, accurate adjustment of which can be obtained by the threaded adjustable abutment 270.

If desired, suitable power means may be associated with the feed screw 36 for effecting vertical movement of the knee 18. Power means for effecting controlled intermittent vertical adjustment of the knee may be of the type disclosed in copending application of Praeg et al., Serial No. 351,344, filed April 27, 1953 (now Patent 2,887,014). Instead of providing for intermittent vertical adjustment of the knee at the end of a stroke of traverse, means may be provided for effecting a gradual vertical movement of the knee without reciprocation of the cutter head thereon, in which case a cutting or gear finishing operation will be carried out by plunge cutting. This results from a relative radial feed between the cutter and work without a reciprocation or other movement in a plane parallel to the axis of the gear.

The drawings and the foregoing specification constitute a description of the improved internal gear shaving machine in such full, clear, concise and exact terms as to enable any person skilled in the art to practice the invention, the scope of which is indicated by the appended claims.

What I claim as my invention is:

1. In a gear finishing machine having a base provided with a work support thereon, ways on said base extending toward and away from said work support, a tool head, means for moving said tool head toward and away from said work support comprising a sub-slide on said ways, power means for effecting slow reciprocatory movement of said sub-slide on said ways, ways on said sub-slide parallel to said first mentioned ways, an abutment on said sub-slide, a second slide on said last mentioned ways, said tool head being mounted on said second slide, and hand-operated toggle mechanism for effecting rapid movement between said slides between a cutting position in which said second slide engages said abutment, and a loading position in which said slide is retracted substantially from said abutment.

2. Structure as defined in claim 1 in which said tool head has a cutter spindle extending therethrough adapted to carry a gear-like cutter at one end to mesh with a work gear on said work support, and a hand wheel at the other end of said spindle to permit registering of the teeth of the cutter and work gear as said cutter head is advanced from loading toward cutting position.

3. Structure as defined in claim 1 which comprises a swivel plate angularly adjustable on said second slide about an axis perpendicular to the said ways.

4. Structure as defined in claim 3, said cutter head including a spindle and being mounted on said swivel plate, and means for effecting fine adjustment of said cutter head on said swivel plate in a direction parallel to the axis of said spindle.

5. In a machine for finishing internal gears which comprises a base provided with a rotary work support thereon, a lower slide movable on said base toward and away from the work support, an upper slide movable on said lower slide in a direction parallel to the direction of movement of said lower slide, a swivel plate carried by said upper slide, a rotary tool support on said swivel plate adapted to support a gear-like tool, means mounting said swivel plate for angular adjustment on said upper slide about a vertical axis perpendicular to and intersecting the axis of said rotary tool support adjacent a tool thereon, power means connected to one of said slides for effective feeding traverse thereof, and manual actuating means connected to the other of said slides for effecting relatively long travel thereof between an operating position in which the tool carried by said tool support is adjacent the work support and a loading position in which the tool support is removed a substantial distance from the work support to provide clearance for loading.

6. In a machine for finishing internal gears which comprises a base provided with a rotary work support thereon a lower slide movable on said base toward and away from the work support, an upper slide movable on said lower slide in a direction parallel to the direction of movement of said lower slide, a swivel plate carried by said upper slide, a rotary tool support on said swivel plate adapted to support a gear-like tool, means mounting said swivel plate for angular adjustment on said upper slide about a vertical axis perpendicular to and intersecting the axis of said rotary tool support adjacent a tool thereon, power means connected to said lower slide for effective feeding traverse thereof, and manual actuating means connected to the said upper slide for effecting relatively long travel thereof between an operating position in which the tool carried by said tool support is adjacent the work support and a loading position in which the tool support is removed a substantial distance from the work support to provide clearance for loading.

7. In a machine for finishing internal gears which comprises a base provided with a rotary work support thereon a lower slide movable on said base toward and away from the work support, an upper slide movable on said lower slide in a direction parallel to the direction of movement of said lower slide, a swivel plate carried by said upper slide, a rotary tool support on said swivel plate adapted to support a gear-like tool, means mounting said swivel plate for angular adjustment on said upper slide about a vertical axis perpendicular to and intersecting the axis of said rotary tool support adjacent a tool thereon, power means connected to said lower slide for effective feeding traverse thereof, manual actuating means connected to the said upper slide for effecting relatively long travel thereof between an operating position in which the tool carried by said tool support is adjacent the work support and a loading position in which the tool support is removed a substantial distance from the work support to provide clearance for loading, the manual actuating means comprising toggle mechanism, and rigid locating abutment means acting between said upper and lower slides engaged when said upper slide is moved into operating position.

References Cited in the file of this patent

UNITED STATES PATENTS

| 2,393,727 | Aber | Jan. 29, 1946 |
| 2,504,578 | Pelphrey | Apr. 18, 1950 |